(12) United States Patent
Tanaka

(10) Patent No.: US 10,081,384 B2
(45) Date of Patent: Sep. 25, 2018

(54) STEERING SYSTEM

(71) Applicant: JTEKT CORPORATION, Osaka-shi, Osaka (JP)

(72) Inventor: Hidenobu Tanaka, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 15 days.

(21) Appl. No.: 15/492,762

(22) Filed: Apr. 20, 2017

(65) Prior Publication Data

US 2017/0313345 A1   Nov. 2, 2017

(30) Foreign Application Priority Data

Apr. 27, 2016  (JP) .................................. 2016-089901

(51) Int. Cl.
  *B62D 1/19* (2006.01)
  *B62D 1/184* (2006.01)
  *B62D 1/187* (2006.01)

(52) U.S. Cl.
  CPC ............. *B62D 1/195* (2013.01); *B62D 1/184* (2013.01); *B62D 1/187* (2013.01)

(58) Field of Classification Search
  CPC .......... B62D 1/18; B62D 1/195; B62D 1/187; B62D 1/184
  See application file for complete search history.

(56) References Cited

U.S. PATENT DOCUMENTS

| | | | | |
|---|---|---|---|---|
| 8,590,933 B2* | 11/2013 | Narita | ..................... | B62D 1/184 280/777 |
| 9,393,986 B1* | 7/2016 | Anspaugh | .............. | B62D 1/184 |
| 2002/0171235 A1 | 11/2002 | Riefe et al. | | |
| 2012/0096977 A1* | 4/2012 | Hirooka | ................. | B62D 1/184 74/524 |
| 2016/0288821 A1* | 10/2016 | Sakuda | ................... | B62D 1/185 |
| 2017/0008549 A1* | 1/2017 | Tomiyama | ............ | B62D 1/184 |
| 2018/0009463 A1* | 1/2018 | Yoshihara | ............. | B62D 1/184 |
| 2018/0015942 A1* | 1/2018 | Sugiura | .................. | B62D 1/184 |

FOREIGN PATENT DOCUMENTS

| | | | | |
|---|---|---|---|---|
| EP | 1661789 A1 | 5/2006 | | |
| EP | 1762462 A1 | 3/2007 | | |
| JP | 2002-145078 A | 5/2002 | | |
| JP | 2014076805 A | * 5/2014 | ............ | B62D 1/184 |
| WO | 2008/086548 A1 | 7/2008 | | |
| WO | 2017/009568 A1 | 1/2017 | | |

OTHER PUBLICATIONS

Sep. 26, 2017 extended Search Report issued in European Patent Application No. 17167594.5.

* cited by examiner

*Primary Examiner* — Karen Beck
(74) *Attorney, Agent, or Firm* — Oliff PLC

(57) ABSTRACT

A column jacket can pivot in a tilt direction around an end of a steering shaft along with the steering shaft. When the column jacket is pivoted in the tilt direction, an engaging member moves in the tilt direction along with the column jacket. A position fixing mechanism has a pair of fixing members located adjacent to opposite ends of an engaged member in a longitudinal direction to fix the position of the engaged member in the tilt direction. The position fixing mechanism fixes the position of the column jacket in the tilt direction by engaging the engaged member with the engaging member. At a time of a secondary collision, the engaged member engaged with the engaging member breaks a front fixing member.

4 Claims, 6 Drawing Sheets

STEERING SYSTEM

INCORPORATION BY REFERENCE

The disclosure of Japanese Patent Application No. 2016-089901 filed on Apr. 27, 2016 including the specification, drawings and abstract, is incorporated herein by reference in its entirety.

BACKGROUND OF THE INVENTION

1. Field of the Invention

The invention relates to a steering system.

2. Description of the Related Art

Japanese Patent Application Publication No. 2002-145078 (JP 2002-145078 A) describes a tilt steering system having a steering column that can swing around a tilt central axis. Swinging the steering column around the tilt central axis allows adjustment of the position of a steering wheel attached to one end of a steering shaft supported by the steering column (tilt adjustment). A fixed bracket fixed to a vehicle body and a tilt bracket fixed to the steering column are coupled together via a coupling shaft passing through a vertically long groove formed in the fixed bracket. The vertically long groove includes a tilt adjustment area through which the coupling shaft moves relative to the vertically long groove during the tilt adjustment, an excess area that extends beyond the tilt adjustment area, and a boundary portion between the tilt adjustment area and the excess area.

At the time of a vehicle collision, when a driver hits the steering wheel, that is, when a secondary collision occurs, the coupling shaft moves toward an upper portion of the tilt adjustment area. When the coupling shaft reaches an upper end of the tilt adjustment area, a buffer shaft passing through the boundary portion between the tilt adjustment area and the excess area in a press-fitted manner climbs over a peripheral portion of the boundary portion and moves relative to the vertically long groove through the excess area. Impact energy is absorbed by friction between the buffer shaft and the peripheral portion of the excess area and by deformation between the buffer shaft and the peripheral portion of the vertically long groove.

In the tilt steering system in JP 2002-145078 A, the relative position between the vertically long groove and the coupling shaft varies according to the position of the steering column resulting from the tilt adjustment. Thus, according to the position of the steering column resulting from the tilt adjustment, the distance varies over which, at the time of a secondary collision, the coupling shaft moves after the coupling shaft reaches the upper end of the tilt adjustment area and before an impact resulting from the secondary collision starts to be absorbed. Therefore, the timing when the impact resulting from the secondary collision starts to be absorbed varies according to the position of the steering column resulting from the tilt adjustment. This may prevent impact absorption from being stabilized.

SUMMARY OF THE INVENTION

An object of the invention is to provide a steering system that allows impact absorption to be stably achieved at a time of a secondary collision regardless of the position of a column jacket resulting from tilt adjustment.

A steering system in an aspect of the invention includes a steering shaft to which a steering member is coupled at a first end of the steering shaft, a column jacket that holds the steering shaft, a bracket that supports the column jacket so as to enable the column jacket to pivot in a tilt direction around a second end of the steering shaft along with the steering shaft, the bracket being fixed to a vehicle body, an engaging member that moves in the tilt direction along with the column jacket when the column jacket is pivoted in the tilt direction, and a position fixing mechanism having an engaged member that is elongate in the tilt direction and that is engaged with the engaging member and a pair of fixing members located adjacent to longitudinally opposite ends of the engaged member to fix a position of the engaged member in the tilt direction, the position fixing mechanism fixing a position of the column jacket in the tilt direction when the engaging member engages with the engaged member at any position thereof. At a time of a secondary collision, the engaged member engaged with the engaging member breaks a first fixing member of the fixing members.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A is a diagram illustrating the lock state, and FIG. 6B illustrates that a fixing member located on a front side of a vehicle is broken at the time of a secondary collision.

DETAILED DESCRIPTION OF EMBODIMENTS

Figure 1:
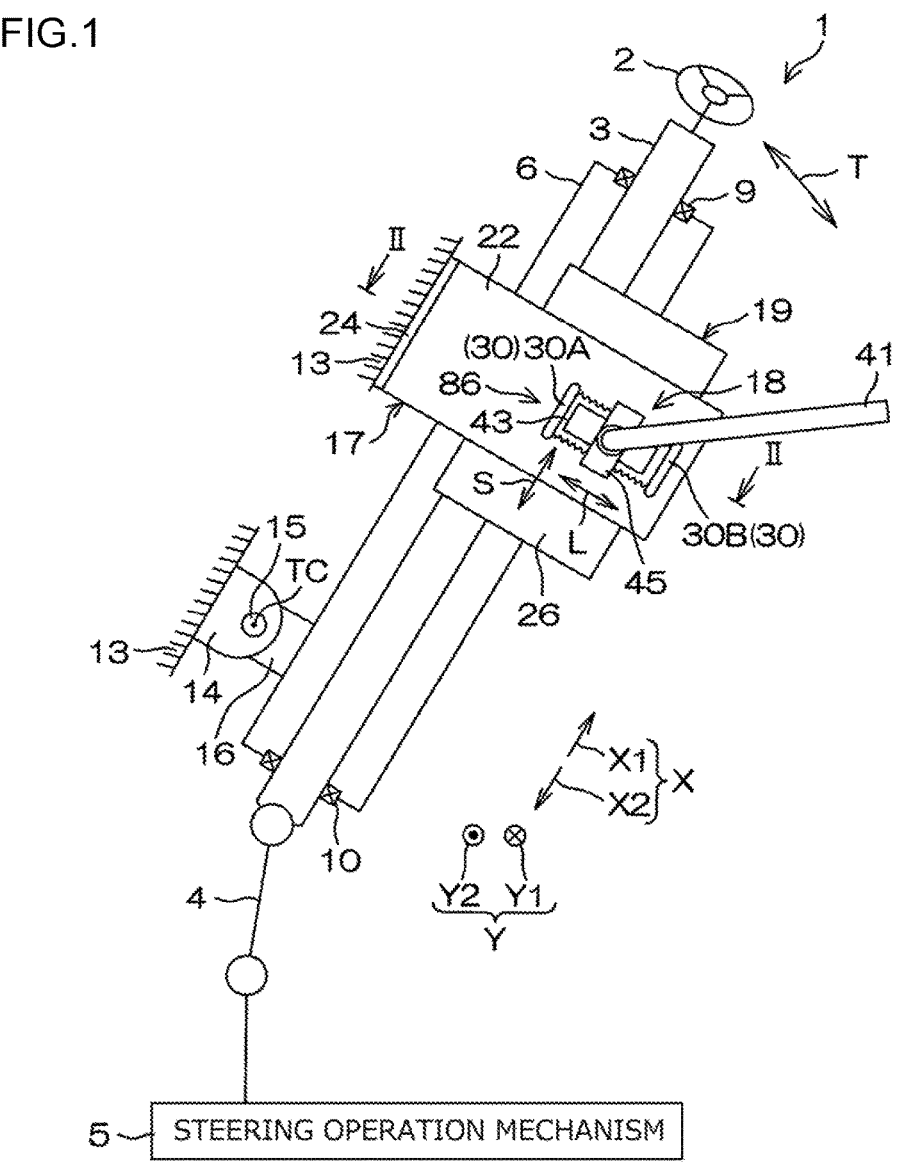
FIG. 1 is a side view depicting a general configuration of a steering system according to an embodiment of the invention.

An embodiment of the invention will be described below with reference to the attached drawings. FIG. 1 is a side view depicting a general configuration of a steering system 1 according to an embodiment of the invention. As seen in FIG. 1, the steering system includes a steering shaft 3, a column jacket 6, an intermediate shaft 4, and a steering operation mechanism 5. The steering shaft 3 extends substantially in an up-down direction in a vehicle. A steering member 2 such as a steering wheel is coupled to a first end (axially upper end) of the steering shaft 3. The steering system 1 steers steered wheels (not depicted in the drawings) in conjunction with steering of the steering member 2. The steering operation mechanism 5 is, for example, a rack-and-pinion mechanism, but is not limited to this.

An upper side of a column axial direction X that is an axial direction of the steering shaft 3 is hereinafter referred to as an axially upper side X1. A lower side of the column axial direction X is hereinafter referred to as an axially lower side X2. The column axial direction X is also an axial direction of the column jacket 6. A direction that is orthogonal to the column axial direction X and perpendicular to the sheet of FIG. 1 is referred to as a lateral direction Y. In the lateral direction Y, a side of the sheet of FIG. 1 that is farther from the reader is a right side Y1, and a side of the sheet of FIG. 1 that is closer to the reader is a left side Y2.

The steering shaft 3 passes through the column jacket 6. The column jacket 6 supports the steering shaft 3 via a pair of bearings 9, 10 arranged at a distance from each other in the column axial direction X so as to make the steering shaft 3 rotatable, and holds the steering shaft 3. The bearing 9 on the axially upper side X1 is arranged between an axially upper end of the column jacket 6 and the steering shaft 3. The bearing 10 on the axially lower side X2 is arranged between an axially lower end of the column jacket 6 and the steering shaft 3.

The steering system 1 includes a lower fixed bracket 14, a tilt center shaft 15, and a lower column bracket 16. The lower fixed bracket 14 is fixed to a vehicle body 13. The tilt center shaft 15 is supported by the lower fixed bracket 14. The lower column bracket 16 is fixed to an outer periphery of a lower end of the column jacket 6 and is rotatably supported by the tilt center shaft 15. The lower fixed bracket 14 supports the column jacket 6 so as to enable the column jacket 6 to pivot in the tilt direction T along with the steering shaft 3 using, as a support, a tilt center TC that is a central axis of the tilt center shaft 15 provided near a second end of the steering shaft 3.

Pivoting the steering shaft 3 and the column jacket 6 around the tilt center TC allows the position of the steering member 2 to be adjusted in a front-rear direction of the vehicle. As described above, the steering system 1 has a tilt adjustment mechanism. The steering system 1 includes an upper fixed bracket 17, an upper column bracket 19, and a clamping mechanism 18. The upper fixed bracket 17 is fixed to the vehicle body 13. The upper column bracket 19 is fixed to the column jacket 6. The clamping mechanism 18 locks the position of the column jacket 6 resulting from tilt adjustment. The clamping mechanism 18 clamps the upper column bracket 19 via the upper fixed bracket 17. This allows fixation of the positions of the column jacket 6 and the steering member 2 in a tilt direction T.

Figure 2:
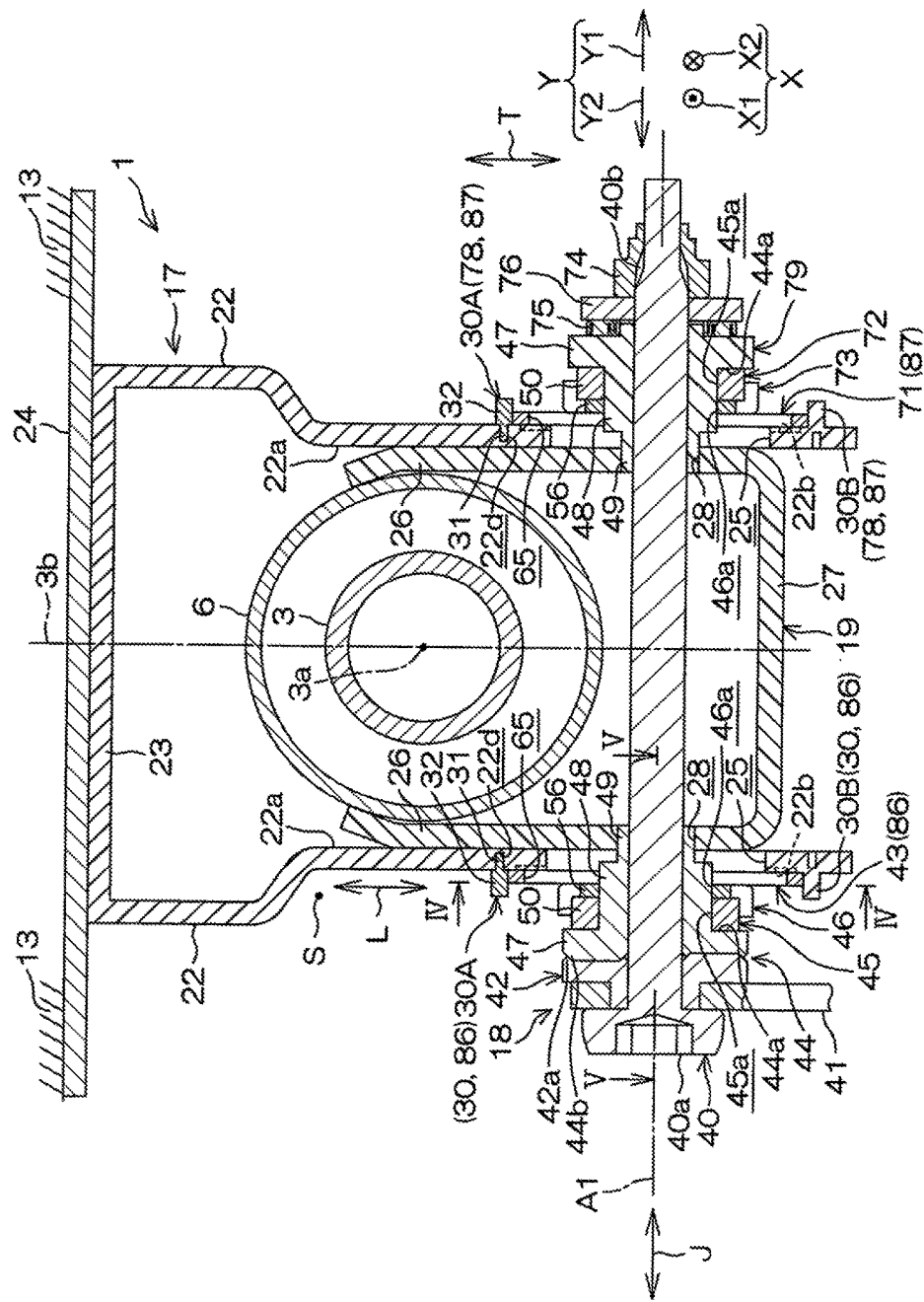
FIG. 2 is a schematic sectional view of the steering system corresponding to a sectional view taken along line II-II in FIG. 1.

FIG. 2 is a schematic sectional view of the steering system 1 corresponding to a sectional view taken along line II-II in FIG. 1. In FIG. 2, a plane extending in the tilt direction T through a central axis $3a$ of the steering shaft 3 is hereinafter referred to as a reference plane $3b$. As depicted in FIG. 2, the upper fixed bracket 17 includes a mounting plate 24, a pair of side plates 22, and a coupling plate 23. The mounting plate 24 is attached to the vehicle body 13. The side plates 22 extend rearward from the mounting plate 24 in the tilt direction T. The coupling plate 23 couples front ends of the side plates 22 in the tilt direction T. In each of the side plates 22, a slot 25 is formed which linearly extends substantially in the front-rear direction of the vehicle.

The upper column bracket 19 integrally includes a pair of side plates 26 and a coupling plate 27. The side plates 26 extend in the tilt direction T. The coupling plate 27 couples rear ends of the side plates 26 in the tilt direction T. The side plates 26 are connected by welding or the like to an outer peripheral surface of the column jacket 6 at front ends of the side plates 26 in the tilt direction T. The side plates 26 of the upper column bracket 19 are arranged between the side plates 22 of the upper fixed bracket 17 and shaped to conform to inner side surfaces $22a$ of the corresponding side plates 22. Insertion holes 28 that are circular holes are formed in the respective side plates 26 of the upper column bracket 19.

The clamping mechanism 18 further includes a clamping shaft 40, an operation member 41, a cam 42, an engaging member 45, and an engaged member 43. The operation member 41 is arranged near the side plate 22 on the left side Y2. The clamping mechanism 18 further includes an engaged member 71, an engaging member 72, a clamping member 79, a nut 74, a needle roller bearing 75, and a thrust washer 76. The engaged member 71 is arranged near the side plate 22 on the right side Y1. The clamping shaft 40 has a central axis A1 extending in a clamping axial direction J orthogonal to the column axial direction X and the tilt direction T. The clamping shaft 40 is a bolt. The clamping shaft 40 passes through the slots 25 in the opposite side plates 22 of the upper fixed bracket 17 and through the insertion holes 28 in the opposite side plates 26 of the upper column bracket 19. A head portion $40a$ is provided at a left end of the clamping shaft 40. A groove $40b$ is formed at a right end of the clamping shaft 40.

The operation member 41, the cam 42, the clamping member 44, the engaging member 45, an elastic member 46, and the engaged member 43 are arranged between the head portion $40a$ of the clamping shaft 40 and the side plate 22 on the left side Y2. A nut 74 is attached to the groove $40b$ in the clamping shaft 40. The annular thrust washer 76 and the needle roller bearing 75, the clamping member 79, the engaging member 72, an elastic member 73, and the engaged member 71 are arranged between the nut 74 and the side plate 22 on the right side Y1. The needle roller bearing 75 and the thrust washer 76 are arranged in this order from the left side Y2 between the clamping member 79 and the nut 74, through which the clamping shaft 40 passes.

Unless otherwise described below, the engaged member 71, engaging member 72, elastic member 73, and clamping member 79 on the right side Y1 correspond to the engaged member 43, engaging member 45, elastic member 46, and clamping member 44 on the left side Y2 moved toward the right side Y1 with respect to the reference plane $3b$ and inverted only in the lateral direction. Thus, the components of the engaged member 71, engaging member 72, elastic member 73, and clamping member 79 on the right side Y1 are denoted by the same reference numerals as those of the components of the engaged member 43, engaging member 45, elastic member 46, and clamping member 44 on the left side Y2 and will not be described below.

The operation member 41 is a lever or the like that can be gripped. The head portion $40a$ of the clamping shaft 40 is fixed to the operation member 41 so as to be rotatable integrally with the operation member 41. The cam 42 is coupled to the operation member 41 so as to be rotatable integrally with the operation member 41 to regulate movement of the cam 42 in the clamping axial direction J with respect to the clamping shaft 40. The central axis A1 of the clamping shaft 40 corresponds to the center of rotation of the operation member 41. A driver operates the operation member 41 to allow the clamping shaft 40 and the cam 42 to pivot along with the operation member 41.

Figure 3:
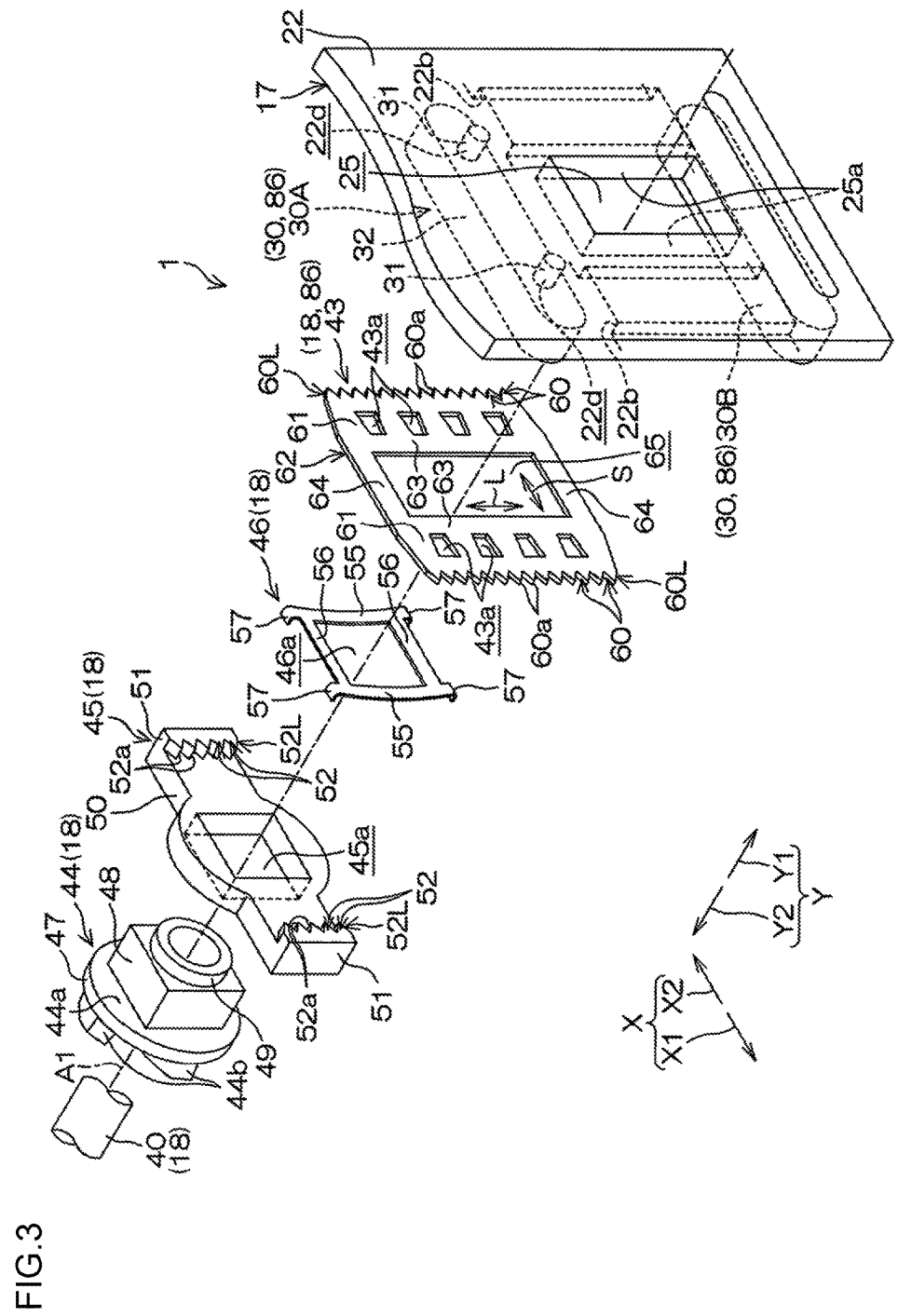
FIG. 3 is a schematic exploded perspective view of members of an upper bracket located near a left side plate of an upper bracket.

FIG. 3 is an exploded perspective view of peripheral members of the side plate 22 on the left side Y2 of the upper fixed bracket 17.

As seen in FIG. 3, the clamping member 44 integrally has an annular pressing portion 47, a rotation regulating portion 48 shaped generally like a rectangular parallelepiped, and a tubular boss portion 49. The rotation regulating portion 48 protrudes from the pressing portion 47 toward the right side Y1 and toward the corresponding side plate 22 of the upper fixed bracket 17. The boss portion 49 protrudes from the rotation regulating portion 48 toward the right side Y1. The clamping member 44 includes a pressing surface 44a that presses an outer side surface of the side plate 22 on the left side Y2. The pressing surface 44a is also a right side surface of the pressing portion 47.

On the cam 42 and the pressing portion 47 of the clamping member 44, cam protrusions 42a, 44b are formed which can press onto each other, as seen in FIG. 2. Unlike the clamping member 44 on the left side Y2, the clamping member 79 on the right side Y1 is not provided with the cam protrusion 44b. As seen in FIG. 3, the engaged member 43 is located adjacent to and on the right side Y1 of the elastic member 46. The engaged member 43 is, for example, an elastically deformable metal plate. The engaged member 43 is elongate in the tilt direction T. To be exact, a longitudinal direction L of the engaged member 43 is a substantial front-rear direction of the vehicle and is also a linear direction intersecting the tilt direction T (see also FIG. 1). The longitudinal direction L is orthogonal to the column axial direction X and the lateral direction Y. Unlike in the present embodiment, the longitudinal direction L may not be orthogonal to the column axial direction X.

The engaging member 45 is located adjacent to and on the right side Y1 of the pressing portion 47 of the clamping member 44. As seen in FIG. 3, the engaging member 45 integrally has a main body portion 50 that is elongate in the column axial direction X, a pair of extending portions 51, and a first tooth row 52L. Each of the extending portions 51 extends from a corresponding one of the opposite ends of the main body portion 50 in the column axial direction X toward the right side Y1. The first tooth row 52L is formed on each of the extending portions 51. A through-hole 45a is formed in the engaging member 45 so as to penetrate the main body portion 50 in the lateral direction Y.

Each of the first tooth rows 52L includes a plurality of first teeth 52 arranged along the longitudinal direction L and each shaped generally like a triangle. The first tooth rows 52L are arranged at a distance from each other in the column axial direction X. The first teeth 52 in the first tooth row 52L on the axially upper side X1 protrude from the extending portion 51 on the axially upper side X1 toward the axially lower side X2 with a tooth tip of each first tooth 52 facing toward the axially lower side X2. The first teeth 52 in the first tooth row 52L on the axially lower side X2 protrude from the extending portion 51 on the axially lower side X2 toward the axially upper side X1 with a tooth tip of each first tooth 52 facing toward the axially upper side X1. Each of the first teeth 52 in the first tooth row 52L has a tooth trace 52a extending in the lateral direction Y.

The engaged member 43 integrally has a pair of second tooth rows 60L, a pair of elastic portions 61, and a main body portion 62. The second tooth rows 60L can mesh with the corresponding first tooth rows 52L. The elastic portions 61 support the respective second tooth rows 60L. Each of the second tooth rows 60L includes a plurality of second teeth 60 arranged along the longitudinal direction L and each shaped generally like a triangle.

The elastic portion 61 is coupled to each end of the main body portion 62 in the column axial direction X. The second tooth row 60L is coupled to the corresponding elastic portion 61.

The main body portion 62 includes a pair of first frames 63 and a pair of second frames 64. The first frames 63 are arranged at a distance from each other in the column axial direction X. The second frames 64 are arranged at a distance from each other in the longitudinal direction L to couple the first frames 63 together. A linear hole 65 linearly extending in the longitudinal direction L is formed in the engaged member 43. The linear hole 65 is a space enclosed by the first frames 63 and the second frames 64.

The second tooth rows 60L are located on the right side Y1 of the main body portion 50 so as to face the corresponding first tooth rows 52L. Each of the elastic portions 61 supports the second teeth 60 in the corresponding second tooth row 60L. Specifically, the second tooth row 60L on the axially lower side X2 is provided at a lower edge of the elastic portion 61 on the axially lower side X2. The second tooth row 60L on the axially upper side X1 is provided at an upper edge of the elastic portion 61 on the axially upper side X1. The second teeth 60 in the second tooth row 60L on the axially lower side X2 protrude from the lower edge of the elastic portion 61 on the axially lower side X2 toward the axially lower side X2 with a tooth tip of each second tooth 60 facing toward the axially lower side X2. The second teeth 60 in the second tooth row 60L on the axially upper side X1 protrude from the upper edge of the elastic portion 61 on the axially upper side X1 toward the axially upper side X1 with a tooth tip of each second tooth 60 facing toward the axially upper side X1. Each of the second teeth 60 in the second tooth row 60L has a tooth trace 60a extending in the lateral direction Y. The second teeth 60 can mesh with the first teeth 52 in the lateral direction Y The first teeth 52 mesh with the second teeth 60 to engage the engaged member 43 with the engaging member 45. The term "engage" means that the engaging member 45 and the engaged member 43 exert force on each other so as to fix the relative position between the engaged member 43 and the engaging member 45 in the tilt direction T.

The elastic member 46 is, for example, a leaf spring formed by pressing one metal plate. The elastic member 46 is located adjacent to and on the right side Y1 of the main body portion 50 of the engaging member 45 (see FIG. 2). The elastic member 46 integrally includes a pair of deformation portions 55 and a pair of coupling portions 56. The deformation portions 55 are arranged at a distance from each other in the column axial direction X. The coupling portions 56 are arranged at a distance from each other in the longitudinal direction L. Each of the deformation portions 55 is curved substantially at a center thereof in the longitudinal direction L so as to bulge toward the left side Y2. The deformation portion 55 can be elastically deformed in the lateral direction Y. Hooking portions 57 are each formed at a corresponding one of the opposite ends of the deformation portion 55 in the longitudinal direction L. Each of the hooking portions 57 is folded toward the left side Y2 like a crank and hooked on the main body portion 50 of the engaging member 45.

The steering system 1 includes a pair of fixing members 30 located at a distance from each other so as to face each other substantially in the front-rear direction of the vehicle. The fixing members 30 face each other in the longitudinal direction L of the engaged member 43. The fixing members 30 are located on opposite sides of and adjacent to the engaged member 43 in the longitudinal direction L. The fixing members 30 may be located on the opposite sides of and in abutting contact with the engaged member 43 in the longitudinal direction L. The fixing member 30 on the front side of the vehicle is hereinafter referred to as a "front fixing member 30A". The fixing member 30 on the rear side of the vehicle is hereinafter referred to as a "rear fixing member 30B".

The fixing members 30 are arranged on the side plate 22 on the left side Y2. The front fixing member 30A is fixed to the side plate 22 on the left side Y2. Each of the fixing members 30 is a substantial rectangular parallelepiped that is elongate in a linear direction S intersecting both the tilt direction T and the longitudinal direction L. The linear direction S is orthogonal to the lateral direction Y. In the present embodiment, the linear direction S is orthogonal to the longitudinal direction L. The linear direction S is also parallel to the column axial direction X, but the invention is not limited to this.

The front fixing member 30A is formed of, for example, resin. However, the invention is not limited to this, and the front fixing member 30A may be formed of metal such as aluminum or iron. The front fixing member 30A integrally includes fixing portions 31 and a protruding portion 32. The fixing portions 31 are fixed in holes 22d formed in the side plate 22 on the left side Y2 by press-fitting or the like. The protruding portion 32 protrudes outward (toward the left side Y2) from the side plate 22 on the left side Y2. The fixing portions 31 include a plurality of shafts provided at intervals in the linear direction S. Unlike in the present embodiment, the fixing portion 31 may be a single shaft provided integrally with the protruding portion 32 or may be shaped like a plate provided integrally with the protruding portion 32 and that is elongate in the column axial direction X. The protruding portion 32 is larger than the fixing portions 31 in the longitudinal direction L as viewed in the column axial direction X. The protruding portion 32 is located on the left side Y2 of and in contact with the side plate 22 on the left side Y2. The front fixing member 30A may be formed by resin molding so as to be fixed to the side plate 22 on the left side Y2. The rear fixing member 30B is formed by extruding the side plate 22 on the left side Y2.

As seen in FIG. 2, the steering system 1 includes a pair of fixing members 78 arranged on the side plate 22 on the right side Y1. The fixing members 78 correspond to the fixing members 30 arranged on the side plate 22 on the left side Y2 that are moved toward the right side Y1 with respect to the reference plane 3b and inverted only in the lateral direction, and thus will not be described. The clamping member 44 is supported by an outer periphery of the clamping shaft 40 so as to be rotatable around the central axis A1 relative to the clamping shaft 40. A tip of the rotation regulating portion 48 and the boss portion 49 of the clamping member 44 pass through the slot 25. At least a tip of the boss portion 49 passes through the insertion hole 28 so as not to rotate relative to the insertion hole 28.

A portion of the rotation regulating portion 48 of the clamping member 44 located on the left side Y2 of a portion of the rotation regulating portion 48 passing through the side plate 22 on the left side Y2 passes through the linear hole 65 in the engaged member 43 so as not to rotate relative to the linear hole 65. A portion of the rotation regulating portion 48 of the clamping member 44 located on the left side Y2 of a portion of the rotation regulating portion 48 passing through the linear hole 65 passes through a space 46a in the elastic member 46 so as not to rotate relative to the space 46a. A portion of the rotation regulating portion 48 of the clamping member 44 located on the left side Y2 of a portion of the rotation regulating portion 48 passing through the space 46a in the elastic member 46 passing through the through-hole 45a in the engaging member 45 so as not to rotate relative to the through-hole 45a.

The clamping shaft 40 is rotatable around the central axis A1 relative to the engaged member 43, the clamping member 44, the engaging member 45, and the elastic member 46.

The clamping member 44 is supported by the side plate 22 on the left side Y2 via the insertion hole 28 so as to be movable integrally with the column jacket 6. The engaging member 45 and the elastic member 46 are supported by the clamping member 44 so as to be movable integrally with the clamping member 44. The clamping shaft 40, the clamping member 44, the engaging member 45, and the elastic member 46 are movable in the tilt direction T along with the column jacket 6 during tilt adjustment. Tilt adjustment is performed to the extent that the rotation regulating portion 48 and the boss portion 49 of the clamping member 44 can relatively move through the slot 25 in the tilt direction T.

The fixing members 30 are located adjacent to the engaged member 43 in the longitudinal direction L. Specifically, the front fixing member 30A is located on the front side (the upper side of the sheet of FIG. 2) of and adjacent to the engaged member 43 in the longitudinal direction L. The rear fixing member 30B is located on the rear side (the lower side of the sheet of FIG. 2) of and adjacent to the engaged member 43 in the longitudinal direction L. This regulates movement of the engaged member 43 with respect to the upper fixed bracket 17 in the longitudinal direction L. The engaged member 43 is supported by the side plate 22 on the left side Y2 of the upper fixed bracket 17 via the fixing members 30.

The rotation regulating portion 48 is movable in the longitudinal direction L with respect to the linear hole 65 but is inhibited from moving in the linear direction S with respect to the linear hole 65. Thus, the engaging member 45 is movable relative to the engaged member 43 in the longitudinal direction L and integrally with the engaged member 43 in the linear direction S. During tilt adjustment, the engaging member 45 moves in the longitudinal direction L relative to the engaged member 43, which moves in the linear direction S. Thus, the first tooth rows 52L of the engaging member 45 move relative to the second tooth rows 60L of the engaged member 43 in the longitudinal direction L. The fixing members 30 extend in the linear direction S and thus allow guidance of movement of the engaged member 43 in the linear direction S with respect to the side plate 22 on the left side Y2.

Now, a clamping operation of the clamping mechanism 18 will be described. In conjunction with rotation of the operation member 41 in a lock direction, the cam 42 rotates with respect to the clamping member 44. The cam protrusion 42a and the cam protrusion 44b press onto each other to move the clamping member 44 away from the cam 42 along the clamping axial direction J. Then, the pressing surface 44a of the clamping member 44 presses the side plate 22 on the left side Y2 via the engaging member 45, the elastic member 46, and the engaged member 43. Consequently, clamping members 44, 79 clamp and fasten the side plates 22 of the upper fixed bracket 17. At this time, the side plates 22 clamp the corresponding side plates 26 of the upper column bracket 19. This regulates pivoting of the column jacket 6 in the tilt direction T, achieving tilt lock.

The "lock" state refers to the state of the steering system 1 where the position of the steering member 2 in the tilt direction T is fixed, that is, where the tilt lock has been achieved. During normal operation, the steering system 1 is in the lock state. On the other hand, when the operation member 41 rotates in an unlocking direction, the clamping member 44 moves closer to the cam 42 along the clamping axial direction J in conjunction with rotation of the cam 42. Specifically, the deformation portions 55 of the elastic member 46 exert an elastic restoration force to move the clamping member 44 closer to the cam 42 along the clamping axial direction J. This releases clamping of the side plates 26 of the upper column bracket 19 caused by the side plates 22 of the upper fixed bracket 17, enabling tilt adjustment.

Figure 4:
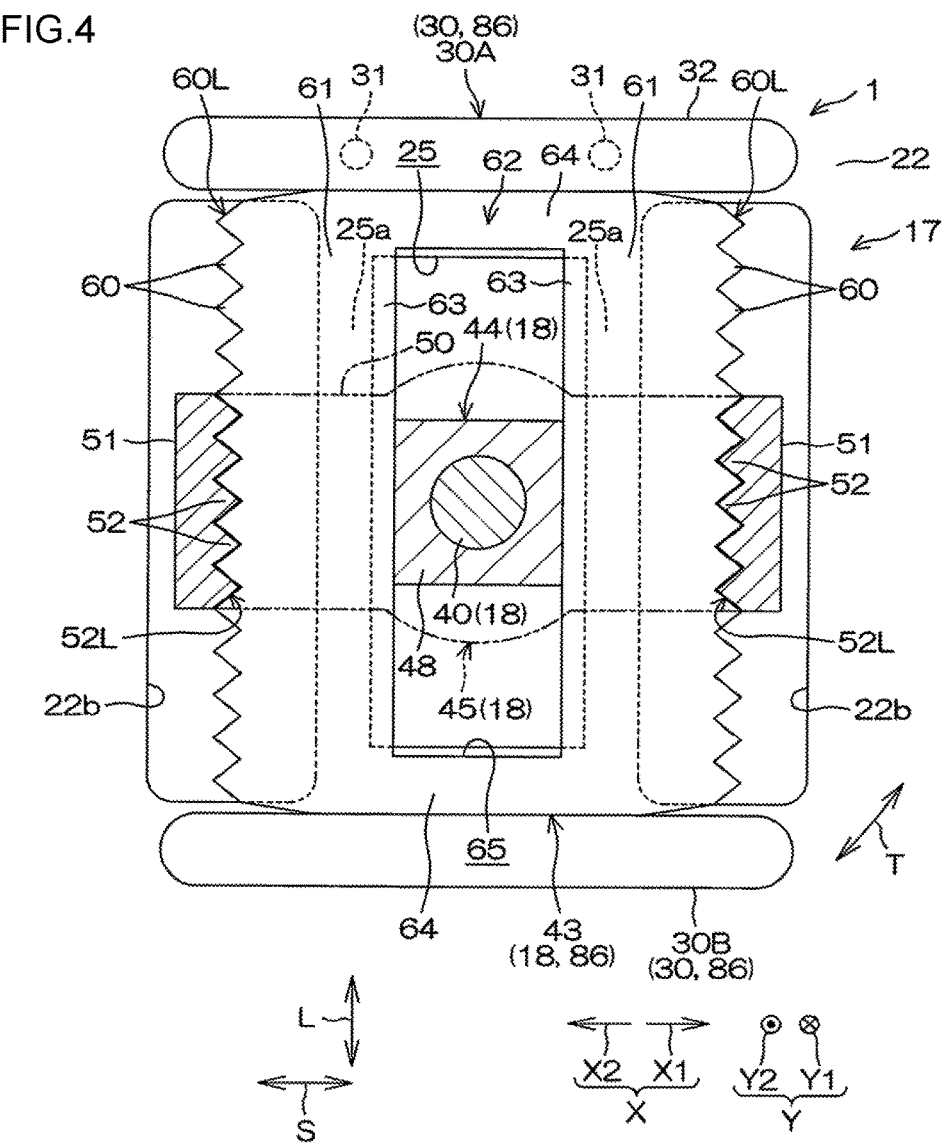
FIG. 4 is a schematic sectional view taken along line IV-IV in FIG. 2 and illustrating a lock state.
Figure 5:
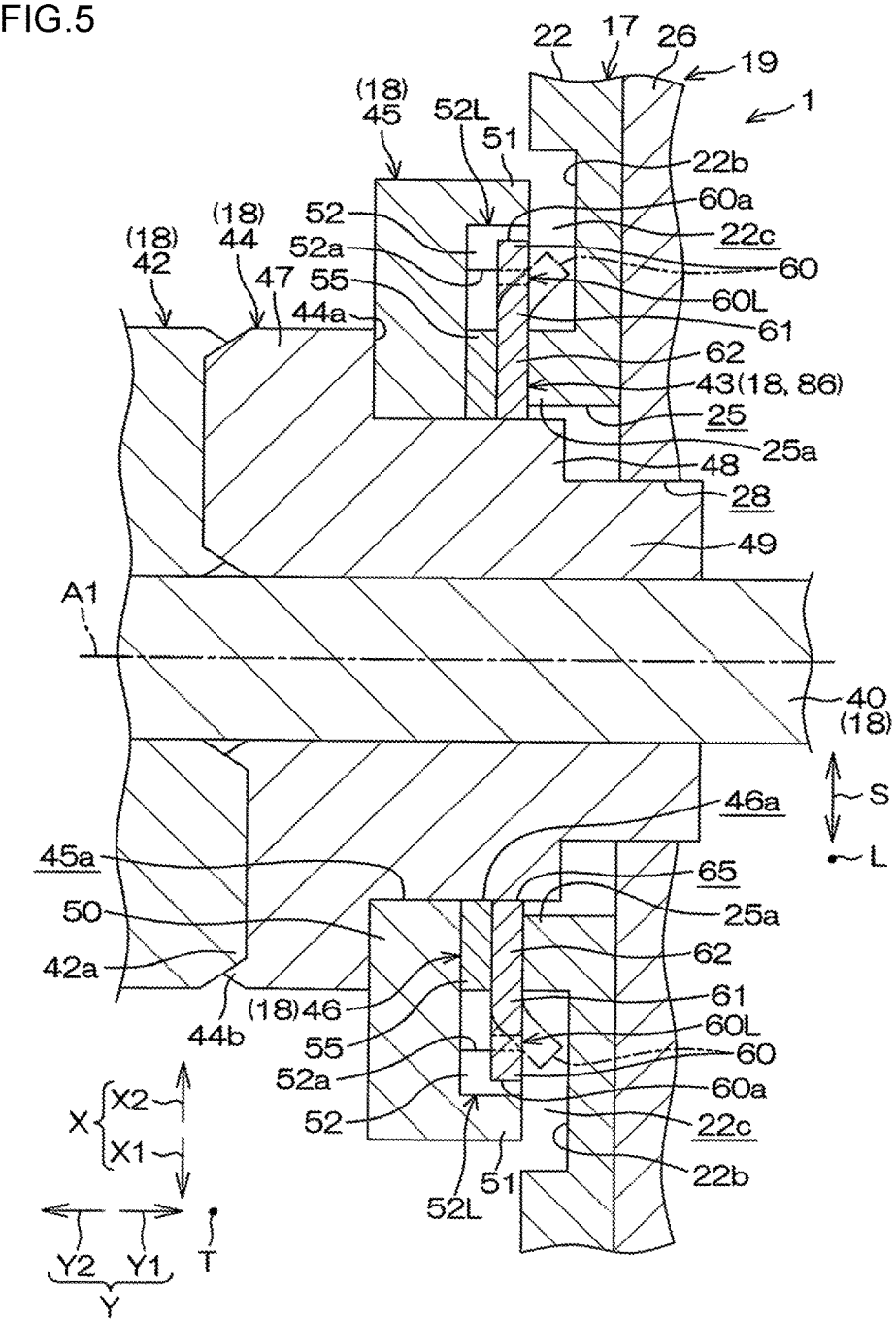
FIG. 5 is a schematic sectional view taken along line V-V in FIG. 2.

A "release state" refers to the state of the steering system 1 where fixation of the position of the steering member 2 in the tilt direction T has been released, that is, where the tilt lock has been released. Now, a meshing operation between the first teeth 52 and the second teeth 60 will be described. FIG. 4 is a schematic sectional view taken along line IV-IV in FIG. 2. In the sectional view taken along line IV-IV, the main body portion 50 of the engaging member 45 essentially does not appear but is depicted by a long dashed double-short dashed line for convenience of description. FIG. 5 is a schematic sectional view taken along line V-V in FIG. 2.

After the tilt adjustment, with the second teeth 60 in the second tooth rows 60L and the first teeth 52 in the first tooth rows 52L in a positional relation where the second teeth 60 do not overlap the first teeth 52 as viewed from the left side Y2, the operation member 41 is operated to move the clamping member 44 and the engaging member 45 toward the right side Y1 and closer to the side plate 22 on the left side Y2 as depicted in FIG. 4. Then, when the operation is complete, with the first teeth 52 meshing with the second teeth 60, the pressing surface 44a of the clamping member 44 presses the side plate 22 on the left side Y2 (a peripheral portion 25a of the slot 25 in the side plate 22 on the left side Y2) via the engaging member 45 and the elastic member 46. Therefore, the lock state can be reached without being inhibited by the first teeth 52 in the first tooth rows 52L and the second teeth 60 in the second tooth rows 60L. The peripheral portion 25a refers to opposite outer portions of the side plate 22 in the column axial direction X that define the slot 25. In this case, the engaging member 45 engages with the engaged member 43 because the first teeth 52 mesh with the second teeth 60 in a direction in which the tooth traces 52a, 60a extend (the direction corresponds to the lateral direction Y) and because the engaging member 45 is pressed against the engaged member 43 via the elastic member 46 (see FIG. 5). The fixing members 30 are located adjacent to the opposite ends of the engaged member 43 in the longitudinal direction L. Thus, the fixing members 30 are located in abutting contact with the opposite sides of the engaged member 43 in the longitudinal direction L. This allows fixation of the position of the engaged member 43 engaged with the engaging member 45 in the tilt direction T. When the fixing members 30 are located in abutting contact with the engaged member 43 engaged with the engaging member 45 in the tilt direction T, the position of the engaged member 43 engaged with the engaging member 45 in the tilt direction T can be more accurately fixed.

After the tilt adjustment, with the second teeth 60 in the second tooth rows 60L and the first teeth 52 in the first tooth rows 52L in a positional relation where the second teeth 60 overlap the first teeth 52 as viewed from the left side Y2, the operation member 41 is operated to move the clamping member 44 and the engaging member 45 toward the right side Y1 and closer to the side plate 22 on the left side Y2. Then, when the operation is complete, each of the second tooth rows 60L rides on the corresponding first tooth row 52L before the pressing surface 44a of the clamping member 44 (see FIG. 5) presses the peripheral portion 25a of the slot 25 in the side plate 22 on the left side Y2. A state where each second tooth row 60L rides on the corresponding first tooth row 52L to prevent the first tooth row 52L from meshing with the second tooth row 60L is referred to as a tooth-on-tooth state.

As seen in FIG. 5, recessed portions 22b are each formed in the side plate 22 on the left side Y2 at a position where the side plate 22 faces the corresponding first tooth row 52L of the engaged member 43. Thus, a space 22c is present on the right side Y1 of the first tooth row 52L. Therefore, in the tooth-on-tooth state, an elastic portion 61 supporting the first teeth 52 in a portion of the first tooth row 52L on which the second tooth row 60L has ridden is deflected, with the first teeth 52 housed in the space 22c, as depicted by a long dashed double-short dashed line in FIG. 5. The engaged member 43 is provided with a plurality of holes 43a as rigidity reducing portions, thus allowing the elastic portion 61 to be easily deflected.

As described above, the elastic portion 61 is deflected toward the right side Y1 to allow each first tooth row 52L to come into pressure contact with the corresponding second tooth row 60L even in the tooth-on-tooth state. The pressing surface 44a of the clamping member 44 transmits force via the engaging member 45, the elastic member 46, and the engaged member 43. Consequently, the side plate 22 on the left side Y2 can be pressed. This prevents rotation of the operation member 41 (see FIG. 2) from being inhibited during operation, allowing the steering system 1 to reach the lock state.

In the tooth-on-tooth state, the engaging member 45 is pressed against the engaged member 43 via the elastic member 46 to engage with the engaged member 43. Even in the tooth-on-tooth state, the fixing members 30 are located adjacent to the engaged member 43 in the longitudinal direction L. Thus, the fixing members 30 are located in abutting contact with the engaged member 43 in the longitudinal direction L. This allows fixation of the position of the engaged member 43 engaged with the engaging member 45 in the tilt direction T.

As described above, the steering system 1 can be brought into the lock state regardless of the positional relation between the first tooth rows 52L and the second tooth rows 60L. That is, regardless of the tilt adjustment position, the steering system 1 can be brought into the lock state, and what is called stepless lock can be achieved. When the steering system 1 in the lock state is brought into the release state, the engaging member 45 is separated from the engaged member 43 along the clamping axial direction J by the elastic restoration force of the deformation portions 55 of the elastic member 46. Consequently, the meshing between the first teeth 52 and the second teeth 60 is released.

As described above, the engaged member 43 and the fixing members 30, which are arranged near the side plate 22 on the left side Y2, function as a position fixing mechanism 86 on the left side Y2 that fixes (locks) the position of the column jacket 6 in the tilt direction T when the engaging member 45 engages with the engaged member 43 at any portion thereof. Like the engaged member 43 and the fixing members 30 on the left side Y2, the engaged member 71 and the fixing members 78, which are arranged near the side plate 22 on the right side Y1, may function as a position fixing mechanism 87 on the right side Y1 that fixes (locks) the position of the column jacket 6 in the tilt direction T when the engaging member 72 engages with the engaged member 71 at any portion thereof.

The steering system 1 is suitable for a steering system for large-sized vehicles (buses, trucks, and the like) that include the steering shaft 3 supported so as to stand nearly upright. The steering system for large-sized vehicles has a larger vehicle mounting angle than a steering system for standard-sized vehicles. Consequently, in a secondary collision where the driver collides against the steering member 2 at the time of a vehicle collision, the steering member 2 moves in the tilt direction T.

Figures 6A, 6B:
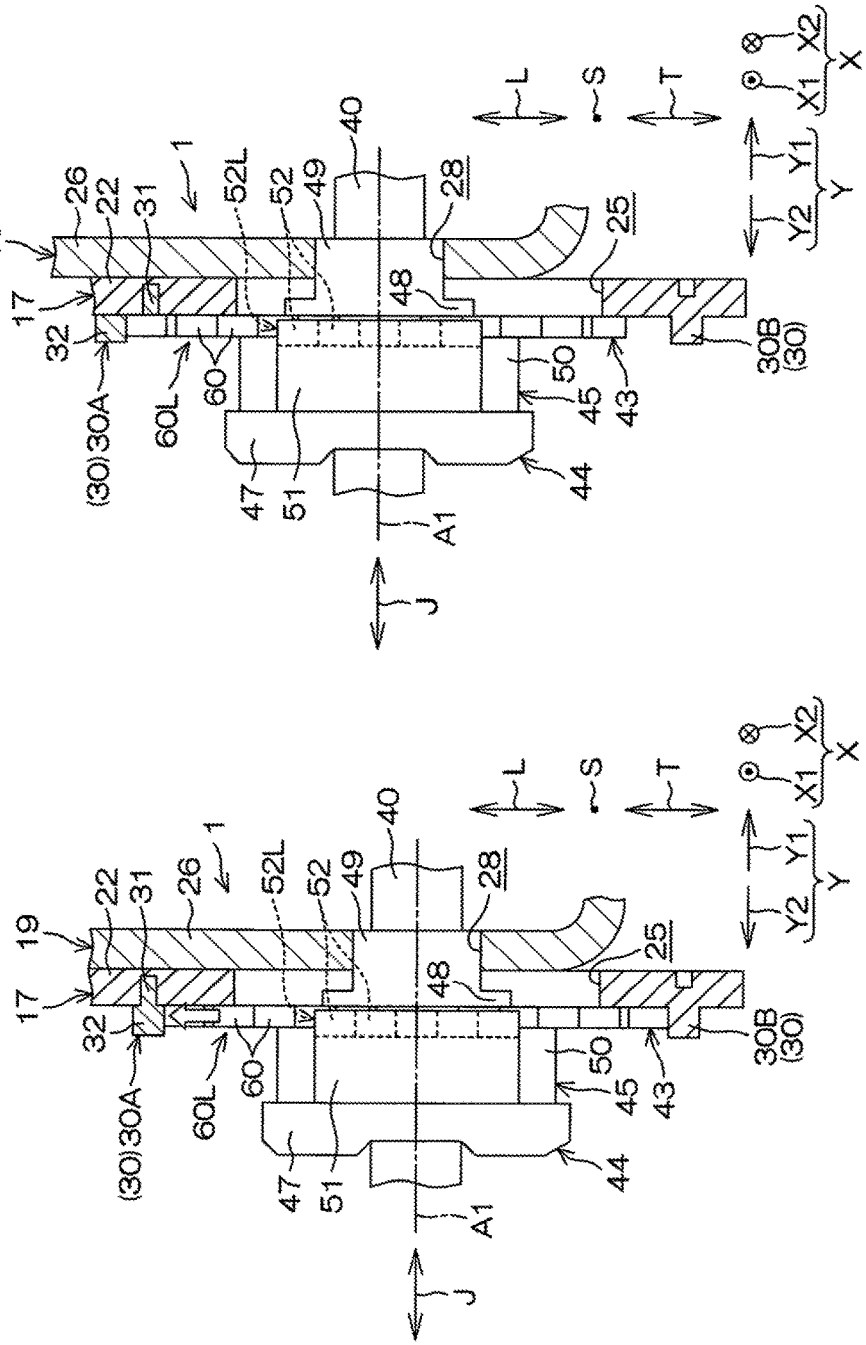
FIGS. 6A and 6B are schematic diagrams of a portion of the upper bracket located near the left side plate thereof.

FIGS. 6A and 6B are schematic sectional views of a portion of the upper fixed bracket 17 located near the side plate 22 on the left side Y2. FIG. 6A is a diagram illustrating the lock state. FIG. 6B is a diagram illustrating the state where the front fixing member 30A is broken at the time of a secondary collision. In FIGS. 6A and 6B, illustration of the elastic member 46 is omitted, and the engaged member 43, the clamping member 44, and the engaging member 45 are illustrated without the use of any section. At the time of a secondary collision, the driver collides against the steering member 2 to cause an impact directed toward the front side of the vehicle to be transmitted to the steering member 2. An impact directed toward the front side of the vehicle is transmitted to the engaged member 43 engaged with the engaging member 45 (as depicted in FIG. 6A), via the steering member 2, the column jacket 6, the clamping shaft 40, the clamping member 44, and the like.

The position of the engaged member 43 engaged with the engaging member 45 in the tilt direction T is fixed by the fixing members 30. Thus, the front fixing member 30A is subjected to an impact directed toward the front side of the vehicle (see a blank arrow in FIG. 6A). Consequently, the engaged member 43 breaks (shears) the front fixing member 30A (a first fixing member of the fixing members 30) as depicted in FIG. 6B. Specifically, a boundary portion between the protruding portion 32 and each fixing portion 31 of the front fixing member 30A is sheared. The engaged member 43 engaged with the engaging member 45 is permitted to move in the tilt direction T. The column jacket 6 pivots in the tilt direction T to move the steering member 2 toward the front side of the vehicle.

Pivoting of the column jacket 6 in the tilt direction T results in generation of friction between each of the side plate 22 of the upper fixed bracket 17 and the corresponding side plate 26 of the upper column bracket 19. Consequently, the impact made at the time of a secondary collision is absorbed by the breakage (shearing) of the front fixing member 30A and the friction between each of the side plates 22 and the corresponding side plate 26. In the present embodiment, the engaging member 45 engages with the engaged member 43 at any position thereof to fix the position of the column jacket 6 in the tilt direction T at the time of a secondary collision. The fixing members 30 are located on the opposite sides of and adjacent to the engaged member 43 in the longitudinal direction L. Thus, regardless of the position of the column jacket 6 resulting from the tilt adjustment, the engaged member 43 engaged with the engaging member 45 can be kept in proximity to the fixing members 30.

Thus, at the time of a secondary collision, regardless of the position of the column jacket 6 resulting from the tilt adjustment, the engaged member 43 comes into quick abutting contact with the front fixing member 30A, which is then broken. Consequently, impact absorption can be stably achieved at the time of a secondary collision. In a configuration in which the front fixing member 30A (the first fixing member of the fixing members 30) is located further forward in the vehicle than the engaged member 43 engaged with the engaging member 45 and is in abutting contact with the engaged member 43, the front fixing member 30A is quickly broken at the time of a secondary collision. Consequently, the impact absorption can be more stably achieved at the time of a secondary collision.

The meshing between the first teeth 52 and the second teeth 60 allows the engaging member 45 and the engaged member 43 to be firmly fixed together. Therefore, the impact made at the time of a secondary collision is quickly and stably absorbed. When a secondary collision occurs in the tooth-on-tooth state, an impact directed toward the front side of the vehicle is transmitted to the engaging member 45 via the column jacket 6 and the clamping shaft 40. The impact may cause the engaged member 34 to move toward the front side of the vehicle along with the engaging member 45, thus breaking the front fixing member 30A. The impact directed toward the front side of the vehicle may cause the engaging member 45 to move toward the front side of the longitudinal direction L with respect to the engaged member 43, thus preventing each second tooth row 60L from riding on the corresponding first tooth rows 52L. Consequently, the steering system 1 is restored to a state before the engaged member 43 is elastically deformed to allow the first teeth 52 to mesh with the second teeth 60 to firmly fix the engaging member 45 to the engaged member 43. In this state, the impact directed toward the front side of the vehicle may be transmitted to the engaged member 43, which may then break (shear) the front fixing member 30A (the first fixing member of the fixing members 30).

The strength (shear load) of the front fixing member 30A can be easily adjusted by varying the material of the front fixing member 30A or the size of the fixing portions 31. When the engaging member 45 moves in the tilt direction T, the engaged member 43 moves in the linear direction S, and the engaging member 45 moves in the longitudinal direction L relative to the engaged member 43. Consequently, the engaged member 43 can be linearly moved during the tilt adjustment with movement of the engaged member 43 during the tilt adjustment interlocked with movement of the engaging member 45 in the tilt direction T. This allows simplification of the shape of the fixing members 30, which guide movement of the engaged member 43.

A distance between a tilt center TC and the clamping shaft 40 is set for each vehicle type. Thus, in a configuration in which the slot 25 extends in the tilt direction T and the set of first teeth 52 and the set of second teeth 60 are each arranged in the tilt direction T unlike in the present embodiment, the curvature of the slot 25 varies according to even a slight change in the distance between the tilt center TC and the clamping shaft 40, which varies according to the vehicle type. A change in curvature leads to the need to change not only the shape of the slot 25 but also the shapes and pitches of the first teeth 52 and the second teeth 60. However, in the present embodiment, the engaging member 45 and the engaged member 43 move linearly in the longitudinal direction L relative to each other. Consequently, the set of first teeth 52 and the set of second teeth 60 can each be linearly arranged. This eliminates the need to change specifications for the slot 25, the first teeth 52, and the second teeth 60 according to the distance between the tilt center TC and the clamping shaft 40, enabling the use of common components.

The invention is not limited to the above-described embodiment, but various changes may be made within a scope recited in claims. For example, unlike in the present embodiment, the slot 25 may extend in the tilt direction T, and the set of first teeth 52 and the set of second teeth 60 may each be arranged in the tilt direction T. In this case, the engaged member 43 does not move in the linear direction S, and the engaging member 45 moves in the tilt direction T with respect to the engaged member 43.

The first tooth rows 52L and the second tooth rows 60L may each include a plurality of teeth having a tooth trace extending in a direction orthogonal to the direction (lateral direction Y) in which each first tooth row 52L and the corresponding second tooth row 60L face each other, that is, a plurality of teeth undulating in the lateral direction Y. The engaging member 45 and the engaged member 43 need not necessarily be engaged with each other by the meshing between the first teeth 52 and the second teeth 60. Consequently, the first teeth 52 may be omitted from the engaging member 45, and the second teeth 60 may be omitted from the engaged member 43. In this case, for example, the engaging member 45 and the engaged member 43 may be engaged with each other by pressing the engaging member 45 against the engaged member 43. Alternatively, the engaging member 45 and the engaged member 43 may be engaged with each other by fitting a recessed portion (protruding portion) formed in the engaging member 45 over (into) a protruding portion (recessed portion) formed on the engaged member 43.

In the steering system 1, a portion of the operation member 41 that is attached to the clamping shaft 40 is arranged rearward of the steering shaft 3 in the tilt direction T. However, the portion of the operation member 41 that is attached to the clamping shaft 40 may be arranged forward of the steering shaft 3 in the tilt direction T. The steering system 1 is not limited to a manual type in which steering of the steering member 2 is not assisted. The steering system 1 may be an electric power steering system of a column assist type or the like in which steering of the steering member 2 is assisted by an electric motor.

Various other changes may be made to the invention within the scope recited in the claims.

What is claimed is:

1. A steering system comprising:
    a steering shaft to which a steering member is coupled at a first end of the steering shaft;
    a column jacket that holds the steering shaft;
    a bracket that supports the column jacket so as to enable the column jacket to pivot in a tilt direction around a second end of the steering shaft along with the steering shaft, the bracket being fixed to a vehicle body;
    an engaging member that moves in the tilt direction along with the column jacket when the column jacket is pivoted in the tilt direction; and
    a position fixing mechanism having an engaged member that is elongate in the tilt direction and that is engaged with the engaging member and a pair of fixing members located adjacent to longitudinally opposite ends of the engaged member to fix a position of the engaged member in the tilt direction, the position fixing mechanism fixing a position of the column jacket in the tilt direction when the engaging member engages with the engaged member at any position thereof, wherein
    at a time of a secondary collision, the engaged member engaged with the engaging member breaks a first fixing member of the fixing members.

2. The steering system according to claim 1, wherein the first fixing member is located further forward in a vehicle than the engaged member engaged with the engaging member and is in abutting contact with the engaged member.

3. The steering system according to claim 1, wherein the engaging member includes first teeth,
    the engaged member includes second teeth enabled to mesh with the first teeth, and
    the first teeth mesh with the second teeth to engage the engaging member with the engaged member.

4. The steering system according to claim 1, wherein when the engaging member moves in the tilt direction, the engaged member moves in a linear direction intersecting the tilt direction, and the engaging member moves in a direction intersecting the linear direction relative to the engaged member, and
    the fixing members guide movement of the engaged member in the linear direction.

* * * * *